Nov. 26, 1929.  A. L. GOODKNIGHT  1,736,910
AIR BRAKE MECHANISM
Filed May 22, 1928  2 Sheets-Sheet 1

Inventor
ALVA L. GOODKNIGHT
By A. L. Jackson
Attorney

Patented Nov. 26, 1929

1,736,910

UNITED STATES PATENT OFFICE

ALVA L. GOODKNIGHT, OF FORT WORTH, TEXAS

AIR-BRAKE MECHANISM

Application filed May 22, 1928. Serial No. 279,718.

My invention relates to air brake mechanism and more particularly to automatic and automatic straight air brakes and system for railway cars, engines, trains and vehicles of various types; and the object is to improve the air brake shown in the patents granted to me October 3, 1905, No. 800,736; February 20, 1906, No. 813,090; and March 19, 1907, No. 847,936; and the principal object is to provide an automatic and automatic straight air brake combination and system and to provide improved mechanism of simple construction by which straight air applications may be made before or following an automatic application of the brakes so that the operation under all circumstances will be certain and positive.

A further object of the invention is to provide an air brake mechanism in which the automatic valve applies the brake with an automatic straight air valve by quick service reduction and holds the application of the brake with the straight air valve after the automatic valve assumes release position, without employing the ordinary standard retaining valve.

A still further object of the invention is to provide an air brake mechanism in which on a quick service application or rather on a number of quick service applications of the automatic valve air brake and if it has not had time to equalize the auxiliary reservoir with the brake pipe pressure for another application, the straight air valve can be automatically operated to apply the brake fully by straight air, thus securing the advantage of a straight air brake system in combination with the automatic air brake system for an entire train.

A still further object of the invention is to provide an air brake mechanism in which a combination automatic straight air brake can be applied by the automatic valve making emergency reductions.

A still further object of the invention is to provide an improved air brake mechanism and system in which the brakes of an engine and entire train will remain set by straight air while the engine brake valve is on lap for holding the automatic valves in application position.

A still further object of the invention is to provide improved air brake mechanism in which a greater combined automatic and straight air emergency application of the brakes can be made and hold the brakes set with automatic straight air brakes on an entire train.

A still further object of the invention is to provide an air brake mechanism in which on a full service application of the automatic valve air brake, the automatic valve will close the quick service port and retain the full pressure in the reserve drum of the automatic straight air brake for the purpose of assisting the recharge of the auxiliary reservoirs and aiding the brake pipe pressure to hold up higher to force the prompt release of all brakes, and thus prevent the rear brakes from dragging down the brake pipe pressure and re-apply and stick the front brakes while the auxiliary reservoirs are recharging on long trains.

A still further object of the invention is to provide an improved air brake mechanism and system in which the engine brakes can be applied with straight air through or around the automatic brake and held set with a single brake valve.

A still further object of the invention is to provide an air brake mechanism and system in which it is impossible to cause an air brake failure operating the brakes under any conditions while the pump is working.

A still further object of the invention is to provide an air brake mechanism in which a combination automatic straight air brake can be shifted around the automatic valve air brake and operate the brake regardless of whether the automatic valve is working or not, thus providing one hundred per cent brakes on a train at all times.

A still further object of the invention is to provide an improved air brake mechanism and system in which the automatic straight air brake can be graduated on and off with the engine brake valve by cycling operations.

With these and other objects in view, as will more fully hereinafter appear, the invention consists in certain novel features of construction and arrangements of parts, hereinafter fully described, illustrated in the accompanying drawings and more particularly pointed out in the appended claims, it being understood that various changes in form, proportions, size and size of ports and minor details of the structure may be made without departing from the spirit or sacrificing any of the advantages of the invention.

Reference is had to the accompanying drawings which form a part of this application.

Similar characters of reference are used to indicate the same parts throughout the several views.

Figures 1, 6, 7, 8, 9, 10, 11, 12, 13, 14:
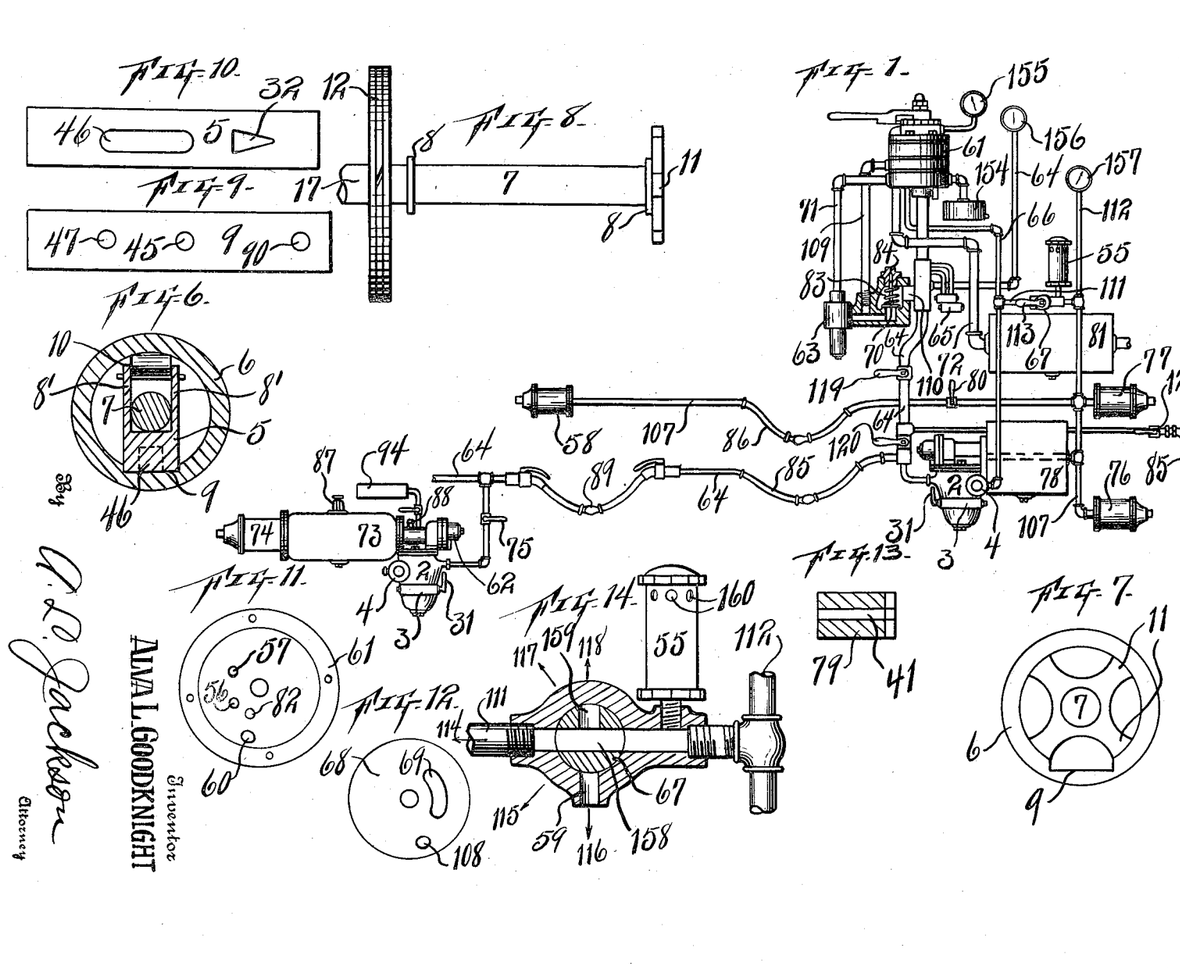
Fig. 1, is a diagrammatic view of the automatic and automatic straight air brake system.
Fig. 6, is a half section end view of the bushing 6, slide valve 5 and piston stem 7.
Fig. 7, is an end view of bushing 6, showing seat 9, piston stem 7 and guides 11, in the bushing.
Fig. 8, is a side view of piston 12, stem 7, lugs 8 and guides 11.
Fig. 9, is a face view of seat 9, showing ports 45, 47 and 90.
Fig. 10, is a face view of slide valve 5, showing cavity 46 and the application port 32 with a graduated width or area.
Fig. 11, is a face view of the rotary seat in brake valve 61, showing ports 56, 57, 60 and 82.
Fig. 12, is a face view of rotary valve 68, showing cavity 69 and port 108.
Fig. 13, is a half section view of brake pipe choke 79, to be inserted in brake pipe passage 25 in the locomotive engine automatic valve only.
Fig. 14, is a hand shift and bleed or release valve 67 and also a reducing valve 55, attached to brake cylinder pipes 112, 111 and 66.
Figures 2, 4:
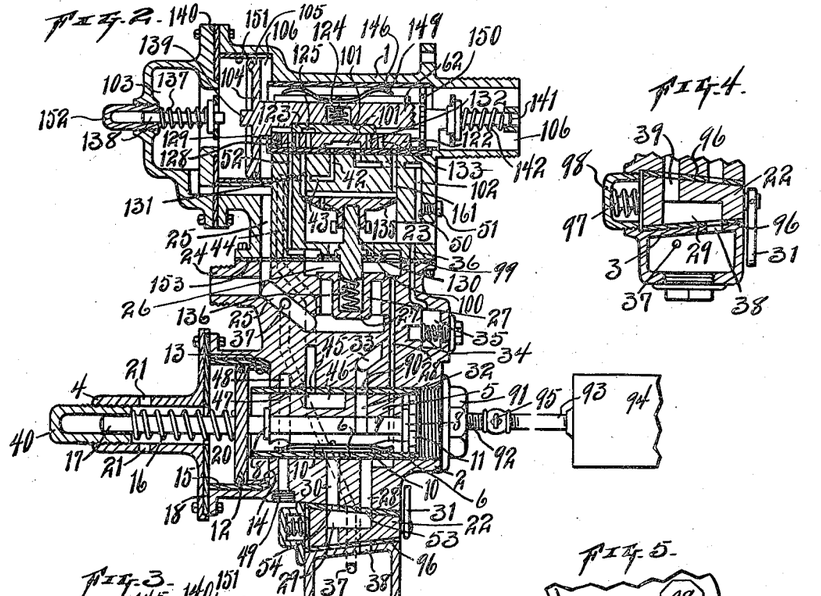
Fig. 2, is a diametrical section of the automatic valve in release position and a diametrical section of the automatic straight air valve in application and holding position.
Fig. 4, is a continuation of Fig. 3, slightly enlarged.

The accompanying drawings Figs. 1 and 2, show the parts in the normal release position of the automatic valve air brake, and in the normal application position of the automatic straight air valve brake, with main reservoir air passing through the usual engine brake valve 61, in running position (with the usual ports not shown in the drawing), then down through the usual brake pipe feed valve 65 (with the usual ports not shown) and into the brake pipe 64; thence through the feed groove 105 into the auxiliary reservoir 73, see Fig. 1. In the meantime the air flows into the automatic straight air valve chamber 19 and reserve drum 94 in communication with the brake cylinder with the exhaust port closed and thus the brakes will apply with straight air until the brake pipe and straight air pressures become greater than the tension of resistance spring 16 of the straight air valve; when this takes place the straight air valve is forced to release position and the brakes release automatically; therefore the brakes on a train make their own straight air test automatically and especially when the source of air supply is first attached to a newly made-up train. This feature avoids the unequalization period of impotency in the standard automatic triple valve air brake, which is due to the fact that it will automatically cut in when the automatic valve brake application equalizes with the auxiliary reservoir and brake pipe, or if it has not yet had time to equalize the auxiliary reservoirs with the brake pipe, and it is again found necessary to apply the brakes, the brake pipe pressure is immediately reduced down to brake cylinder equalization and the spring resistance of the straight air valve, then the automatic straight air brake will apply the brake fully. Therefore the brake cylinder pressure cannot become less than the resistance of the tension in spring 16 of the automatic straight air valve and the liability of accidents due to the automatic valve air brake failure are therefore avoided by controlling the final release of the brake application with the automatic straight air valve.

Figures 3, 5:
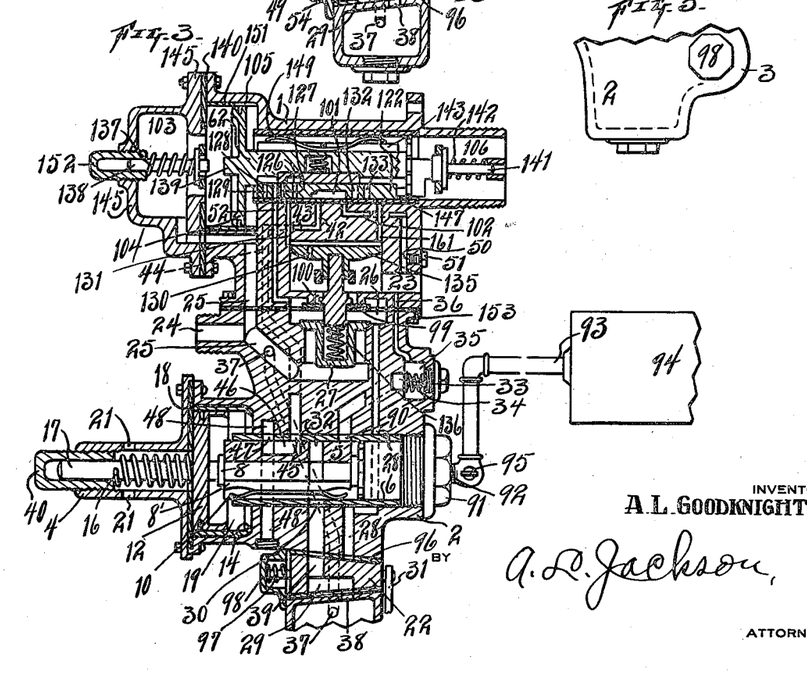
Fig. 3, is a vertical section of both the automatic valve and the automatic straight air valve showing the ports connected and in release position.
Fig. 5, is an end view of the parts shown in Fig. 4.

Fig. 3, shows the automatic straight air valve brake in automatic release position after the brake pipe, auxiliary and straight air chamber pressures have become greater than the brake cylinder equalization and has therefore placed the release ports of both valves in communication with the exhaust port to the atmosphere with equalization established.

The valve chamber or case 1 is provided with a cap 145 bolted to the case 1. The slide valve 122 moves in a cylindrical bushing 146 which is mounted in casing 1. The slide valve 122 is held in place on its stem 62 by collars 143 and grooved seat 147 is formed in the bottom of bushing 146 for the valve 122, and the valve is held in the seat 147 by a leaf spring 149. The piston stem 62 is guided in its longitudinal movement by a flange 150 on the end of the piston which is cut out to form passages for the air. The flange guide 150 moves in the bushing 146. The cut-outs are made in the flange so that the guide will not interfere with the operation of the air through the ports of the valve 122 as shown in the Fig. 7. The guide 150 holds the piston 104 in true position in the piston chamber or cylinder casing 1. A brass or bronze bushing 151 is mounted in the casing 1 for the piston 104 which is provided with a suitable packing ring. The piston 104 is adapted to seat on bushing 146; when moved inward or to the right to retarded release and restricted recharge position. A gasket 140 forms an air tight seal between the cap 145 and the body 1 and also for the piston 104. The piston separates the auxiliary reservoir chamber 106 and brake pipe chamber 103. The cap 145 is secured to the body 1 by bolts. A graduating stem 138 is provided in cap 145, which has a spring 137 mounted thereon and secured in position by cap screw nut 152. The combined check valve and automatic straight air brake valve and shift valve case 2, with a gasket 153, is secured to the body 1 with bolts, as shown in Fig. 2 and Fig. 3. The shift valve case 3 is also combined with the check valve case 2. The valve chamber or case 2 is provided with a cap 4 bolted to the case 2. The slide 5 moves in a cylindrical bushing 6 which is mounted in casing 2. The slide valve 5 is held in place on its stem 7 by collars 8 and grooved seat 9 is formed in the bottom of the bushing 6 for the valve 5 and the valve is held in the seat 9 by a leaf spring 10. The piston stem 7 is guided in its longitudinal movement by a flange 11 on the end of the piston which is cut out to form passages for the air. The flange guide 11 moves in the bushing 6. The cut-outs are made in the flange guide so that the guide will not interfere with the operation of the air through the ports of the valve 5, as shown in Fig. 7. The guide 11 holds the piston 12 in true position in the piston chamber or cylinder of casing 2. The casing 2 is secured to the body 1 with bolts. A brass or bronze bushing 15 is mounted in the casing 2 for the piston 12 which is provided with a suitable packing ring. The piston 12 is provided with a cup or skirt 13 for collecting greater force, and this cup or skirt is adapted to seat on the beveled seat 14 which is formed at the lower end of the bushing. A spring 16 is mounted on the guide 17 which is rigid or separate with the piston 12, and this spring holds the piston 12 on the seat 14 for an automatic straight air brake application and holds both the automatic and the automatic valve release. A gasket 18 forms an air tight seal between the cap 4 and the body 2 and also for the piston 12. The piston 12 separates the straight air pressure chamber 19 and reserve drum 94 from the chamber 20 for atmospheric pressure. By reason of the ports 21 only normal atmospheric pressure is ever in the chamber 20.

A shift valve 22 is mounted in a casing 3 and held to its seat in bushing 96 by coil spring 97 and secured by cap screw nut 98, which is an extension of the casing 2. This shift valve 22 is provided for the purpose of supplying train or brake pipe air from the automatic valve or direct from the brake pipe to the automatic straight air chamber 19 and reserve drum 94 and to the brake cylinders 74, 76, 77 and 58 (see Figs. 1, 2 and 3), through port 23, which leads through the pipes 64 and 107 to the brake cylinders 74, 76, 77 and 58. (See Fig. 1.) Air pressure reaches the valve 22 in the following described manner: The pressure comes in through the train pipe connection 24 and through the passage 25 and raises the check valve 27 and flows into chamber 26 and thence through the passage or duct 28 into the port 29 in valve 22. The pressure then leaves the valve 22 through the port 30 in the valve casing 2 and into chamber 19 and reserve drum 94. (See Fig. 2.) In these operations the handle 31 occupies the position shown in Fig. 2. (The chamber 19 contains the slide valve 5.) From chamber 19 the pressure, as long as the pressure is, for illustration, 50 pounds (more or less) passes through application port 32 with graduated width or area in slide valve 5 and thence through the port 90 and passage 33 and lifts check valve 34 and goes into chamber 35 and thence through the passage 36 to and through the brake cylinder port 23 into the brake cylinders 74, 76, 77 and 58, through pipes 64 and 107.

In case the automatic valve is working or not working, the handle 31 is turned to the position shown in Figs. 3 and 4. The pressure goes through brake pipe connection 24 into passage 25 down the passage 37 for the purpose of shifting around the automatic valve. The pressure goes through passage 37 to the shift valve 22 and enters this valve through port 38. The pressure then leaves shift valve 22 through port 39 into passage 30 to chamber 19 and reserve drum 94. As long as the pressure in chamber 19 and drum 94 is, for illustration, 50 pounds (more or less) or brake cylinder equalization and piston 12 in normal position, the pressure will pass from chamber 19 through application port 32 in slide valve 5, and thence through the port 90 and passage 33 and lifts the check valve 34, going into chamber 35 and thence through the passage 36 to and through the brake cylinder port 23 into the brake cylinders 58, 74, 76 and 77, through pipes 64 and 107. In this position the pressure in reserve drum 94 does not assist in the release and recharging of the brakes.

Fig. 2 shows the automatic straight air brake in application position and holds the application of the automatic valve brake application after the automatic valve moves to release position. In this position, the pressure in chamber 19 is, for illustration, 50 pounds (more or less) or brake cylinder equalization. In Fig. 2, the position of the automatic valve and the automatic straight air brake valve are shown in different positions. The automatic valve 62 is in normal release and the automatic straight air valve 5 in normal application position. Fig. 3 shows the release positions of the automatic valve and the automatic straight air brake valve. In this Fig. 3 the release position is shown, and this occurs when there is a greater brake pipe pressure than the auxiliary reservoir and the equalization of the brake pressure in the brake cylinders 58, 74, 76 and 77. In the automatic valve a port 43 is made in the automatic valve casing 1 and then into the automatic straight air brake valve case 2 and connects with the passage 44 and passage 44 connects with port 45 in the slide valve bushing 6 and thus into the cavity 46 in slide valve 5. Pressure leaves cavity 46 through port 47 in bushing 6 and goes through passage 48 in casing 2 and out through the threaded port 49. A pipe or gage may be connected in this port 49. These connections make provision for automatic release of the brakes.

A manually operated release valve 87 and 88 may be provided for the brake cylinder 74 release. (See Fig. 1.) A port 50 is made in the automatic valve case 1 and is closed by a plug 51. In the place of the plug 51, a hand operated bleeding valve 88 may be inserted for bleeding the brake cylinder 74 pressure when the source of supply is detached from the train.

Provision is made for the quick service reduction of pressure in the automatic valve to be utilized in reducing the pressure in the automatic straight air brake valve for applying the brake with straight air pressure and holding the automatic brake application as shown in Fig. 2. A quick service port 52 in the automatic valve is made use of in this operation. The port 52 is connected to the chamber 26 and passage 28 and thence through port 53 into cavity 29 in plug valve 22 and then out port 54 through passage 30 into chamber 19 and reserve drum 94. This will reduce the pressure in chamber 19 and drum 94 until it reaches the equalization in the auxiliary reservoir or the brake application and brake or train pipe pressures. The illustration of the last operations above described is shown in Fig. 2. However, in the emergency applications of the brake the large vent port 100 is used when the vent valve 99 opens to the brake cylinder to admit brake pipe air; the pressure in the automatic straight air chamber 19 and its reserve drum 94 is reduced through passage 28 and chamber 26, vent port 100 through passage 23 into the brake cylinder and sets the brake with automatic and straight air. The extra volume of air from the reserve drum 94 combining with the train pipe and auxiliary reservoir pressure gives a higher equalization of pressure in the brake cylinder and therefore a greater braking power. The reserve drum 94 is connected to chamber 19 with air pipe 93 and secured by threads 92 into screw cap 91. A cut-out valve 95 is provided in case it should be found necessary to cut out the drum 94; the air pressure in reserve drum 94 will also serve to assist in the brake release by aiding the recharge of the auxiliary reservoirs through quick service port 52. Briefly described, the operation of the automatic straight air valve with automatic valve control on a train is as follows:

With the automatic valve in normal release and charging position and the automatic straight air valve in normal application position and with the engine brake valve in running position, air from main reservoir 81, for illustration, 90 pounds (more or less) passes into the brake pipe feed valve 65, which reduces it 20 pounds (more or less), and flows into the brake pipe 64, connection 24 and passage 25, into chamber 103, thence around piston 104 through the feed groove 105 into chamber 106, also passing through the quick service port 52 into chamber 106 and reservoirs 73 and 78, until the automatic pressure equalizes at, for illustration, 70 pounds (more or less) with the brake pipe. In the meantime, it has lifted check valve 27, and passes into chamber 26 and through passage 28 into chamber 19 and reserve drum 94, thence into straight air application port 32 in slide valve 5 into passage 33, raises check valve 34, passes into chamber 35, flows into passage 36 to brake cylinder passage 23, thence into brake cylinders 74, 76, 77 and 58, applies the brakes until it reaches a pressure, say for illustration, 50 pounds (more or less). Then, when the pressure in chamber 19 becomes greater than, for illustration, the 50 pounds (more or less) tension of resistance spring 16 it compresses the spring. This forces cup piston 12 out against atmospheric pressure until it seats on gasket 18. Lug 8 forces slide valve 5 to move with piston 12. The slide cavity 46 causes automatic air exhaust ports 45 and 47 to register with straight air exhaust port 48. Then with the automatic valve held in release position, the brake cylinder air pressure will all escape to the atmosphere through passages 23, 102, cavity 101, passages 42, 43, 44 and port 45, cavity 46, port 47 and exhaust passage 48 and the brakes release. The automatic straight air valves remain in release position, while the automatic valve air brakes are operating above the resistance of spring 16 of the straight air valve, say for illustration, with 5, 10 and 15 pounds brake pipe reduction of air pressure to force the automatic valve to move out and respond with a like amount of auxiliary reservoir air reductions, or above 50 (more or less) pounds brake pipe and auxiliary pressure and until pressure in chambers 26 and 19 and reserve drum 94 reduce into the brake cylinders, through quick service port 52 down to, for illustration, 50 pounds (more or less). Then straight air piston 12 is forced in by spring 16 against reserve drum pressure in chamber 19, until it stops on seat 14 and lug 8 forces slide valve 5 to move along with it. Cavity 46 blanks exhaust ports 45 and 47, closes exhaust port 48 and registers application port 32 (of graduated width or area) with port 33. Brake pipe air in passage 25 is free to lift the check valve 27, pass into chamber 26, thence through ports 28, 53, cavity 29, port 54 and passage 30 into chamber 19 and reserve drum 94, thence through application ports 32 and 33, then raises check valve 34 and passes into chamber 35 through passages 36 and 23 into the brake cylinders and the brakes remain set, say for illustration, with 50 pounds (more or less) auxiliary reservoir and straight air pressures while valve handle 31 is in upright position, as shown in Fig. 2. After the equalization is established and the brakes have been released and it is necessary to apply to the automatic valves 62 with quick service reductions the brake pipe pressure is reduced gradually with, say for illustration, 5, 10 or 15 pounds air pressure. The preponderance of air pressure then created in the auxiliary chambers 106 and 19 forces piston 104 out to the left until the shoulder on the end of the piston stem 62 strikes against the right-hand end of the slide valve 122, when it is also moved to the left until the piston stem 139 strikes the graduating spring 137; the first movement of the graduating valve 123 closes the feed groove 105, preventing air from feeding back into the brake pipe from the auxiliary reservoir 106, and also opens the upper end of port 132 in the slide valve 122, while the movement of the latter closes the connection between port 102 and the exhaust port 42 and brings port 132 into partial registration with port 102. Auxiliary reservoir pressure then flows through port 132 in the slide valve and port 102 to the brake cylinder through port 23. At the same time, the first movement of the graduating valve connected the two ports 127 and 126 in the slide valves, by the cavity 125 in the graduating valve 123 and the movement of the slide valve brought port 127 to register with port 52 and port 126 with port 131. Consequently, the air pressure in chambers 26, 19 and reserve drum 94 and passage 25 flows through port 28, by check 27, through ports 52, 127, cavity 125, ports 126 and 131, thence through port 130, in the emergency piston 135, to passage 23, and the brake cylinders. The emergency pistons 135 and vent valve 99 and check valve 27 are held in normal position by the compression of spring 136. When auxiliary pressure has reduced slightly less than that of the brake pipe pressure, the automatic valve will move back in lap position, blanks its ports and holds the brake set. Should it be necessary to avoid reducing the pressure in chambers 26 and 19 and reserve drum 94 while applying the brakes and hold the pressure to assist in holding up the brake pipe pressure to make a quick, easy release of the brakes, then a full service application must be made to reduce brake pipe pressure more rapidly than that of the auxiliary, the difference in pressure on the two sides of piston 104 soon becomes sufficient to slightly compress the graduating spring 137 and move slide valve 122 far enough to the left to register release port 132 fully, with port 102 in this position, quick service port 52 is closed, so that no air flows from the brake pipe 25, chamber 19 and reserve drum 94 to the brake cylinder. Consequently, when the release is made on a long train, say for illustration, 100 cars, the brake pipe pressure increasing above that of the auxiliary reservoirs forces the automatic valves on about the first 35 cars on the front end to move into the extreme right, due to the higher brake pipe pressure in the front cars, the piston stem of piston 104 strikes retarding stem 141, compresses spring 142, piston 104, seats on bushing 146, closes feed grooves 105, slide valve 122, causes cavity 101 to register exhaust ports 42 and 102, the small extension of cavity 101 is over port 42, restricting the discharge of air from the brake cylinder to the atmosphere. Piston 104 has also forced slide valve 122 to register restricted port 129 with quick service port 52, and the rate of recharge from chambers 26, 19 and reserve drum 94 is one-fourth (more or less) of that of feed groove 105 and recharge ports 52 and 128 of the rear brakes, the full normal pressure held in chambers 26, 19 and reserve drum 94, with the aid of spring 136, holds check valve 27 closed and permits the brake pipe pressure to hold and build up much faster throughout the train, which makes the release and recharge more prompt. The automatic valves on the cars beyond the 35 (more or less) front ones, have only brake pipe pressure enough to force them to a prompt full release position; therefore, the automatic pistons 104 have moved to the right, stopped against stem 141, held in position with spring 142, slide valve 122 and graduating valve 123 have opened ports 52 and 128, thus permitting all the brakes to release easily and quickly with a sufficiently aided pressure to insure the quick recharge of all the auxiliary reservoirs without the usual trouble of the air brakes now in use recharging the auxiliary reservoirs and dragging down the brake pipe pressure, re-applying and sticking the front brakes on long trains. However, the automatic valve controls the release of the brake application only as long as the brake pipe and auxiliary reservoir pressure are greater than the tension of resistance spring 16 of the automatic straight air valve 5. After the auxiliary reservoir 73, chamber 19 and reserve drum 94, and brake pipe pressure become about even or less than the tension of spring 16, then the automatic straight air valve controls the brake release as shown in Fig. 2. The pressure in chamber 19 and drum 94 is reduced through quick service port 52 and emergency port 100 with quick service and emergency reductions. This is automatic valve control of the straight air valve for applying the brakes with straight air and holding the automatic application. The emergency application is made with a quick, heavy reduction of brake pipe pressure, which causes the greater auxiliary reservoir pressure to instantly force piston 104 out to the left, stem 139 strikes the graduating stem 138, compresses spring 137, seats on gasket 140, slide valve 122 moves with piston stem 62, uncovers port 161, permits auxiliary reservoir air in large volume to enter the top of piston 135, depresses it, and opens large vent valve 99, spring 136 is compressed. Brake pipe air pressure lifts check valve 27 and flows through the large vent port 100, into port 23 along with reserve drum pressure, and thence into the brake cylinder and applies the brake with greater instantaneous force than the present air brakes now in use. After the pressure has become equal on both sides of vent valve 99 and piston 135, spring 136 forces them upwardly until the vent valve 99 seats and closes emergency port 100. The release of the brake application is accomplished by increasing the brake pipe pressure above that of the auxiliary reservoir, which forces piston 104 back to the right as shown in Fig. 3.

Referring to Figs. 3 and 4. For automatic straight air application control, in case the automatic valve is working or not working, turn handle 31 and close automatic valve port 28 and open ports 38 in bushing 96, cavity 29, ports 39 and 30. This is done to shift around the automatic valve and to apply the automatic straight air valve directly with brake pipe reductions. With the ports thus set, pressure comes in through brake pipe connection 24, goes through passages 25 and 37, enters port 38, thence through cavity 29, ports 39 and 30 into chamber 19 and drum 94. The application and release of the brakes is not the same as described in the last paragraph but is that described and illustrated in Figs. 3 and 4. In this position, the automatic straight air application is controlled by the engine brake valve 61, independently of the automatic valve 62 in casing 1, and the release of the brakes is controlled by both automatic valve 62 and the automatic straight air valve 5, the automatic valve 62 being in release position. The engine brake valve 61 is provided with a straight air port 60 in lap position and when it is necessary to hold the engine and train brakes set with the automatic or straight air pressure of the brake pipe, the brake valve handle is placed in lap position. This blanks all other ports except port 108, in rotary valve 68, which registers with port 60 in the brake valve, main reservoir air from the top of rotary valve 68 flows down through ports 108, 60, into pipe 71, the usual reducing valve 63 reduces down to, for illustration, 50 pounds, (more or less) pressure, passes into valve 84 (see Fig. 1) and if the brake pipe pressure in brake pipe 64 is not greater than straight air pressure it lifts check valve 70 and passes through port 110 into the brake pipe 64, passes through to all the automatic or duplex automatic straight air valves and into the brake cylinders and holds them set with straight air pressure as above described.

The engineer's brake valve is operated in the usual manner to apply the brakes with service or emergency applications, and the release of the brake applications is accomplished with the usual movement of the brake valve to full release and then back to running position. In other words, the automatic service application is made by reducing brakepipe pressure, say for illustration, 5, 10, 15 or 20 pounds, and the emergency application is made with a quick heavy reduction of brakepipe pressure. The release of the brake application is made by increasing the brakepipe air pressure above auxiliary reservoir pressure to force the automatic piston 104 to release position or above the equalization of the brake applications. The automatic valve brake and the automatic straight air valve brake applications can be repeated as often as may be necessary and also graduate the brakes off without any danger of air brake failure and without the use of retaining valves. It is therefore impossible to cause an air brake failure while operating the brake as long as the air pump operates. If the pump should fail, then the brakes should apply by brake pipe leakage and stop the train; however, in order to hold the engine and tender brakes set and release the train brakes the engine brake valve handle is moved to full release position; this holds the exhaust ports 56 and 57 blank in the brake valve and the engine brakes remain set.

The operation of the automatic straight air brake application graduated on and off, is accomplished by applying the brakes until they equalize with the auxiliary reservoir and brake pipe at, say for illustration, 50 pounds (more or less) pressure, and the resistance of spring 16. Then move the brake valve handle to release position enough to start the release of all the brakes; then the brake valve handle is placed in lap and straight air position; brake pipe air pressure will then reduce quickly through the automatic valve feed grooves and by brake pipe leakage, as soon as the pressure has reduced down less or equal to the resistance of the automatic straight air valve. The straight air valve will then close the exhaust port and hold the brakes set. However, to be sure of a prompt brake application a reduction of brake pipe air should be made if necessary to apply the brakes with straight air without waiting for the auxiliaries of the automatic valve to recharge again. These operations may be repeated just as long as the air pump furnishes a pressure slightly greater than the tension of resistance spring 16. Should the brake pipe pressure become less than the spring 16 resistance, the brakes will not release. If it is necessary to apply the engine brakes with straight air through or around the automatic valve independently of the train brakes, the engine brake valve handle is turned to half way running and straight air position. This blanks port 57. The cavity 69 in rotary valve 68 registers port 56 with the straight air port 82. Straight air pressure reduced to, for illustration, 50 pounds (more or less) from reducing valve 63 flows through pipe 109, port 82 into port 56 and thence down through the automatic or duplex automatic straight air valve exhaust pipe 66 and brake cylinder or exhaust pipe 66 and pipes 111 and 112. As the pressure in the brake pipe is greater than 50 pounds, it has therefore forced the automatic valve and straight air valve to release position and opened the exhaust ports; the straight air flows from pipe 66 into exhaust port 48, 47, cavity 46, ports 45, 44, 43, 42, cavity 101, port 102, into passage 23 and thence, at the same time, into the brake pipe 111, 112 and pipe 107, into brake cylinders 76, 77 and 58 and applies the brakes with straight air, and when necessary to release the engine brakes the handle of brake valve 61 is moved back into full running position; rotary valve 68 blanks straight air supply port 82 and cavity 69 registers exhaust ports 56 and 57 together, and the pressure in the brake cylinders 58, 76 and 77 escapes back through the same passage to the atmosphere, thus releasing the brakes. These straight air applications of the engine brakes may be repeated as often as necessary without applying the train brakes. A check valve 70 is provided between the brake pipe 64 and reducing valve 63, for the purpose of keeping the higher or greater brake pipe pressure from flowing into pipe 109 and straight air port 82. (See Fig. 1.)

The usual brake cylinder safety valve 55 may be employed on the brake cylinders on cars if necessary, and it is especially provided and used in the brake cylinder or connection pipe 111 on the engines for the purpose of reducing the excess pressure in the brake cylinders. When an automatic brake application is made on top of a straight air application without releasing the engine brakes, the usual main reservoir 81 and equalizing drum 154 are used in connection with the engine brake valve 61; also gauges 155, 156 and 157 are provided for registering main reservoir brake pipe and brake cylinder pressure. (See Fig. 1.) A manually operated cut-out and release valve 67 are provided in the exhaust and brake cylinder pipes 66, 111 and 112, and is located in the connection pipe 111, for the purpose of connecting the exhaust pipe 66 to the brake cylinder pipe 112, to shift the straight air application around the automatic duplex valve in application position with the exhaust port closed. When the handle 113 is placed on the line 114, the brake cylinder pipe 112 and exhaust pipe 66 are connected through port 158; then the straight air pressure is free to flow from the main reservoir 81 through pipe 72, brake valve 61, port 60, pipe 71, through reducing valve 63, pipe 109, port 82, cavity 69, port 56, with brake valve in straight air application position and the automatic straight air valve in normal position; the exhaust ports 47 and 48 are therefore closed; the straight air is then forced to pass through pipes 66 and 111 with shift valve 67 open through port 158 and handle 113 on line 114 into pipe 112 and 107 and applies the brakes, as shown in Fig. 1 and Fig. 14. When it is necessary to release the brakes, the air pressure returns back through the same passages into the exhaust pipe 66, and out to the atmosphere through port 56, cavity 69 and port 57 with engine brake valve handle in running position.

Referring to Fig. 14, when valve handle 113 (see Fig. 1) is placed on line 114 in connection pipe 111, air flows through pipes 66, 111, port 158 and into pipes 112 and 107, thence into the brake cylinders 77, 76 and 58; and when placed on line 116 it connects the exhaust passage 66 and 111 to the atmosphere through ports 159, 158 and 59, which releases the brakes without the exhaust passing through the brake valve 61 and in this position the brake cylinder pipe 112 is closed; also when the handle 113 is placed on line 118, the exhaust pipes 66 and 111 are closed and the brake cylinder pipe 112 is open to the atmosphere through ports 159, 158 and 59, thus permitting the brake cylinder pressure to escape and release the brakes; should it be necessary to close pipes 111 and 112, valve handle 113 is placed on lines 115 and 117. These are lap positions and all the ports are therefore blank. A brake pipe choke 79 may be used for inserting in the brake pipe connection 24 and passage 25 of the automatic and automatic straight air or duplex valve on the engine, and it is used only for the purpose of restricting the passage through small port 41, to avoid the quick, heavy emergency application of the engine brakes which would be liable to cause damage to the driving wheel tires. (See Fig. 13.) Spring 124 holds graduating slide valve 123 in position on its seat on top of slide valve 122. 119, 120 and 121 are cut-out plug valves in brake pipe 64. 80 is a cut-out plug valve in brake pipe 64. 85, 86 and 89 are the usual air hose and couplings. 160 is a plurality of the usual relief ports in safety valve 55. 40 is a threaded adjusting screw plug in cap 4, for the purpose of holding stem 17 and to vary the tension of spring 16 for regulating the resistance of piston 12 of the automatic straight air brake valve 5.

What I claim is:—

1. In an air brake mechanism, provided with a main valve; a straight air brake valve in combination with said main valve having means for by-passing air pressure past said main valve, and means for causing applications of air pressure for braking purposes.

2. In an air brake mechanism provided with a main valve, a straight air brake valve in combination with said main valve having a casing attached to the main valve casing, said casing having an air passage leading from the brake pipe connection, a valve having ports adapted to communicate with said passage, a chamber for said valve and a bushing in said chamber rigid therewith and said chamber and bushing having ports adapted for communication with the ports of said valve, and said casing having ports leading from said valve casing to the brake cylinders, substantially as described.

3. In an air brake mechanism, an automatic straight air valve, in combination with a main valve mechanism an auxiliary reservoir, a brake pipe and reserve drum having means for applying the brakes in quick service applications, means for reduction of brake pipe air pressure to admit combined auxiliary reservoir, brake pipe, and reserve drum pressure to the brake cylinders for a greater brake cylinder pressure.

4. In an air brake mechanism, an automatic straight air brake mechanism having a reserve air pressure drum attached thereto and a quick service chamber having a port for holding the full normal pressure in said drum while the main valve makes a full service application of the brake for the purpose of aiding in the recharge of the auxiliary reservoir and of assisting in holding up the brake pipe pressure to make a quick and easy release of the brakes.

5. In an air brake mechanism, an automatic straight air brake mechanism provided with a valve having means for applying the brake in emergency by a quick heavy reduction of brake pipe pressure and having an auxiliary reservoir and reserve drum for admitting brake pipe pressures for a greater brake cylinder pressure.

6. An air brake mechanism provided with a valve having means for applying the brake in emergency by a quick heavy reduction of brake pipe pressure and having an auxiliary reservoir and reserve drum for admitting brake pipe pressure for a greater brake cylinder pressure.

7. In an air brake mechanism provided with a brake valve and handle therefor; means for adapting said valve for supplying automatic straight air into the brake cylinders consisting of a port formed in the seat of the body of the said brake valve and a rotary valve provided with a port adapted to register with said port in said brake valve when the rotary valve is turned to lap position.

8. In an air brake mechanism provided with a brake valve and handle therefor and a rotary valve; means for making applications of straight air around the automatic brake valve consisting of application and release ports formed in the seat of the brake valve body and a cavity formed in the face of the rotary valve adapted to bridge said application and release ports.

9. In an air brake mechanism provided with a brake valve and handle therefor and a rotary valve; means for making applications of straight air around the automatic brake valve consisting of application and release ports formed in the seat of said brake valve and a cavity formed in the face of said rotary valve adapted to bridge any two of said ports and a supply port formed in the seat of said brake valve and a port formed in said rotary valve adapted to register with said supply port.

10. In an air brake mechanism provided with a brake valve and handle therefor and a rotary valve; means for making applications of straight air around said brake valve consisting of application and release ports formed in the seat of the body of said brake and a cavity formed in the face of said rotary valve adapted to bridge any two of said ports and a supply port formed in the seat of said brake valve and a port formed in said rotary valve adapted to register with said supply port, and pipes operatively connecting said valves to the brake pipe of a train.

11. In an air brake mechanism including an auxiliary reservoir, a reserve drum, an emergency vent valve, a check valve, a main valve having a piston exposed on one side to brake pipe pressure and on the other side to auxiliary reservoir pressure and reserve drum co-operating therewith, the said reserve drum pressure being exposed when said piston is in release position of said main valve, the said main valve being provided with connecting ports for controlling the charging of said auxiliary reservoir and said reserve drum with air pressure, a quick service charging and straight air valve reduction port from said auxiliary reservoir through said main valve and to said reserve drum and straight air valve chamber and to the brake cylinder, and connecting with said emergency check valve port, a large emergency port from the brake pipe to the brake cylinder, a service port from said auxiliary reservoir through said main valve to the brake cylinder, and a large emergency port from the auxiliary reservoir controlled by said valve to the top of the emergency vent valve piston, said ports being operable to the brake cylinder while said valve is operating with service or emergency reductions of brake pipe pressure, the said valve being arranged to operate quick service, full service, emergency and straight air brake valve applications, and to maintain the full brake cylinder pressure, and to release the said applications to the atmosphere, substantially as described.

12. In an air brake mechanism, a valve controlling the quick and full service and straight air and emergency applications of the brake cylinder, a piston exposed on one side to brake pipe pressure and on the other side to auxiliary reservoir pressure, said valve having a casing provided with an air passage leading from the brake pipe connection, a valve having ports adapted to communicate with said passage, a chamber for said valve and a bushing in said chamber rigid therewith and said chamber and bushing having ports adapted for communication with the ports of said valve and said casing having ports leading from said valve casing to the brake cylinders, and a release port from said brake cylinders controlled by the said valve to the atmosphere.

13. In an air brake mechanism, a main valve for controlling an automatic service and emergency application of the brakes when the pressure is at or above brake cylinder equalization pressure and a straight air brake valve for controlling straight air applications of the brakes when the pressure is at or below brake cylinder equalization pressure, and means for making a straight air application on top of said service or emergency application to hold a constant straight air pressure in the brake cylinders.

14. In an air brake mechanism, a main valve for controlling automatic service and emergency applications of the brakes when the pressure is at or above brake cylinder equalization pressure and a straight air brake valve for controlling straight air applications of the brakes when the pressure is at or below brake equalization pressure, and means for making a straight air application on top of said service and emergency applications consisting of air brake pipe and reserve drum pressure acting on one side of said straight air brake valve and a spring acting on the other side of said straight air brake valve, to hold a constant straight air pressure in the brake cylinders.

15. In an air brake mechanism provided with a main valve, a straight air brake valve having means for by-passing air pressure past said main valve for causing applications of air pressure for breaking purposes in case said main valve fails to operate.

16. In an air brake mechanism, main and straight air brake valves provided with pistons, the piston of said main valve being exposed on one side to brake pipe pressure and on the other side to auxiliary reservoir pressure and the piston of said straight air brake valve being exposed on one side to reserve drum and brake pipe pressure and on the other side to atmospheric pressure, a spring co-operating with the atmospheric pressure, to resist the reserve drum and brake-pipe pressure for holding said valve in normal application position, a by-pass valve between said main valve and said straight air brake valve for turning the air pressure past said main valve to said straight air brake valve, and means for positioning both valves to control the release of the brake application, substantially as described.

17. In an air brake mechanism, a valve for automatically controlling a straight air application of the brake and the release of the application by reductions and increases of the brake pipe pressure, said valve having a piston exposed on one side to brake pipe and reserve drum pressure and on the other side to atmospheric pressure, and a spring tending to resist said brake pipe and reserve drum pressure.

18. In an air brake mechanism, a reserve drum and a valve operatively connected to said drum for automatically controlling the application and release of the brake and for retaining the full normal reserve drum pressure in said reserve drum with full service application of the brake for the purpose of aiding the brake pipe pressure to hold up and assist the release and recharge of the brakes by reductions and increases of the brake pipe pressure.

19. In an air brake mechanism provided with an auxiliary reservoir and a straight air valve and reserve drum, a valve for controlling a quick service application of the brake and the release of the application with brake pipe pressure, auxiliary reservoir pressure, and straight air and reserve drum pressure by reductions and increases of said pressures, and means for holding the application while the said valve returns to release position by an increase of brake pipe pressure.

20. In an air brake mechanism provided with an auxiliary reservoir and a straight air and reserve drum, a valve for controlling the operation of the straight air and reserve drum application of the brake by quick service reductions of brake pipe, auxiliary reservoir, and reserve drum pressures, for a greater brake cylinder pressure, means for holding the brake set with straight air, and means for releasing the application by an increase of the brake pipe pressure.

21. In an air brake mechanism provided with a reserve drum, a spring-actuated valve having a piston exposed on one side to a brake pipe and reserve drum pressure and on the other side exposed to the atmosphere and the pressure of said spring, said spring resisting said reserve drum pressure and holding said valve in a normal application position to apply and retain the brake application, and a valve and a port therein for increasing the reserve drum pressure through a charging application of brake pipe pressure to force the valve and its piston against the atmospheric pressure and the spring tension to release the brake application.

22. In an air brake mechanism including an auxiliary reservoir and a reserve drum and brake cylinders; a valve having a piston exposed on one side to brake pipe pressure and on the other side to auxiliary reservoir pressure and provided with a charging and a reduction port and an application port for the purpose of charging said auxiliary reservoir and reserve drum and the further purpose of reducing the pressure in said reserve drum with quick service and emergency applications of the brakes and for applying the brakes with greater combined brake cylinder pressure and means for making straight air brake applications in the brake cylinders while the automatic brake mechanism is in lap position.

23. In an air brake mechanism including brake cylinders and an auxiliary reservoir and a reserve drum; a valve provided with a charging port, a reduction port, and an application port for the purpose of charging said auxiliary reservoir and reserve drum and for the purpose of reducing pressure in said reserve drum with quick service applications of the brakes and for applying the brakes with greater combined brake cylinder pressure and provided with quick service, full service, and emergency ports adapted to co-operate with the first named ports.

24. In an air brake mechanism including brake cylinders and an auxiliary reservoir and a reserve drum, and an emergency vent piston; a valve provided with a charging port, a reduction port, and an application port for the purpose of charging said auxiliary reservoir and reserve drum and for the purpose of reducing pressure in said reserve drum with quick service applications of the brakes and for applying the brakes with greater combined brake cylinder pressure and provided with quick service, full service, and emergency ports adapted to co-operate with the first named ports, a piston for said valve, and means for controlling said piston in the operation of said ports, and in the operation of said emergency vent piston.

25. In an air brake mechanism, a main valve for controlling an automatic service emergency application of the brakes when the pressure is at or above brake cylinder equalization pressure and a straight air brake valve for controlling straight air applications of the brakes when the pressure is at or below brake cylinder equalization pressure, a piston for said straight air brake valve, and means for varying the resistance of said piston in the operations of brake pipe and reserve drum pressures.

26. In an air brake mechanism, a straight air brake valve, a valve chamber therefor having a seat in one side thereof for said valve provided with a brake cylinder, release port and a release port to the atmosphere and an application port, said valve having a cavity adapted to bridge said brake cylinder release port and said atmosphere port and having a graduated port adapted to register with said application port for making applications in the brake cylinders, and a non-return check valve co-operating with said application port in making said applications.

27. In an air brake mechanism, a main valve for controlling automatic service and emergency applications of the brakes when the pressure is at or above brake cylinder equalization pressure and a straight air brake valve for controlling straight air applications of the brakes when the pressure is at or below brake cylinder equalization pressure, and a non-return check valve for preventing a back flow of high engine brake pipe pressure in said straight air applications.

In testimony whereof, I set my hand, this 19th day of May, 1928.

ALVA L. GOODKNIGHT.